United States Patent
Hsu et al.

(10) Patent No.: US 10,298,137 B2
(45) Date of Patent: May 21, 2019

(54) ADVANCED FREQUENCY REDUCTION OF QUASI-RESONANT CONVERTERS

(71) Applicant: SEMICONDUCTOR COMPONENTS INDUSTRIES, LLC, Phoenix, AZ (US)

(72) Inventors: Chien-Tsun Hsu, Taipei (TW); Li Lin, Zubei (TW); Youngbae Park, Taipei Zhongsan (TW)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 6 days.

(21) Appl. No.: 15/711,112

(22) Filed: Sep. 21, 2017

(65) Prior Publication Data

US 2018/0262096 A1     Sep. 13, 2018

Related U.S. Application Data

(60) Provisional application No. 62/469,873, filed on Mar. 10, 2017.

(51) Int. Cl.
*H02M 3/335*     (2006.01)
*H02M 1/00*     (2006.01)

(52) U.S. Cl.
CPC ... *H02M 3/33523* (2013.01); *H02M 3/33507* (2013.01); *H02M 2001/0035* (2013.01); *H02M 2001/0058* (2013.01); *Y02B 70/1433* (2013.01); *Y02B 70/1491* (2013.01); *Y02B 70/16* (2013.01)

(58) Field of Classification Search
CPC . H02M 2001/0032; H02M 2001/0035; H02M 2001/0058; H02M 3/335; H02M 3/33507; H02M 3/33523; Y02B 70/1433
See application file for complete search history.

(56) References Cited

U.S. PATENT DOCUMENTS

| | | | |
|---|---|---|---|
| 6,545,882 B2 | 4/2003 | Yang | |
| 7,208,985 B2 | 4/2007 | Yamashita | |
| 2008/0084713 A1* | 4/2008 | Baurle | H02M 3/33515 363/21.01 |
| 2008/0130324 A1* | 6/2008 | Choi | H02M 3/33507 363/21.03 |
| 2010/0157631 A1* | 6/2010 | Lim | H02M 1/44 363/41 |
| 2010/0164455 A1 | 7/2010 | Li et al. | |
| 2010/0219802 A1* | 9/2010 | Lin | H02M 3/33507 323/284 |

(Continued)

*Primary Examiner* — Fred E Finch, III
(74) *Attorney, Agent, or Firm* — Atesa Legal PLLC

(57) ABSTRACT

A method for frequency reduction of a quasi-resonant (QR) converter includes detecting a valley point of a resonant waveform of the QR converter, by detecting a voltage level of the resonant waveform falling below a first threshold voltage. A blanking time is formed from the beginning of a QR conversion cycle to the valley point. The blanking time is extended in response to a first reduction of an output loading of the QR converter, while maintaining a primary current of the QR converter at a first current level. The primary current is reduced to a second current level being less than the first current level, while maintaining the blanking time at a maximum blanking time, in response to a second reduction of the output loading.

20 Claims, 12 Drawing Sheets

(56) References Cited

U.S. PATENT DOCUMENTS

| | | | | |
|---|---|---|---|---|
| 2010/0302812 A1* | 12/2010 | Moon | ............... | H02M 3/33507 |
| | | | | 363/21.01 |
| 2011/0007526 A1* | 1/2011 | Zhang | ................ | H02M 3/1563 |
| | | | | 363/21.02 |
| 2012/0049822 A1* | 3/2012 | Li | ........................ | H02M 3/156 |
| | | | | 323/282 |
| 2013/0294118 A1* | 11/2013 | So | ..................... | H02M 3/33507 |
| | | | | 363/21.16 |
| 2016/0241150 A1* | 8/2016 | Hsu | .................. | H02M 3/33523 |
| 2017/0012538 A1* | 1/2017 | Barrenscheen | ... | H02M 3/33507 |
| 2017/0179832 A1* | 6/2017 | Hwang | ............. | H02M 3/33569 |
| 2017/0264202 A1* | 9/2017 | Finkel | ..................... | H02M 3/24 |
| 2018/0019664 A1* | 1/2018 | Lin | ........................ | H02M 1/44 |

* cited by examiner

ADVANCED FREQUENCY REDUCTION OF QUASI-RESONANT CONVERTERS

CROSS-REFERENCE TO RELATED APPLICATIONS

This application is a utility application claiming priority to U.S. Provisional Application Ser. No. 62/469,873 filed on Mar. 10, 2017 entitled "ADVANCED FREQUENCY REDUCTION WITH QUASI-RESONANT CONTROL FOR WIDE INPUT AND OUTPUT CONDITIONS," the entirety of which is incorporated by reference herein.

FIELD

The disclosure relates generally to quasi-resonant power converters, and more specifically to reducing the switching frequency of power converters, while improving audio noise reduction during a burst mode operation.

BACKGROUND

Quasi-resonant (QR) power converters transfer energy packets from a primary-side of a transformer to the secondary-side of the transformer. This energy transfer is controlled by switching a transistor on the primary side with pulse width modulation (PWM) to control the amplitude and duration of each packet. As the loading on the secondary-side (e.g. output) is reduced, the energy packets are reduced in amplitude and duration, resulting in higher frequency switching. Higher frequency switching is undesirable as it causes larger switching losses.

One method of controlling the increase in switching frequency, due to the reduction in output loading, is to limit or increase the width of the energy packets in exchange for a further reduction in packet amplitude. To prevent switching discontinuities, the frequency is switched coincident with a minimum level, or valley, of a resonant waveform on the primary-side. By detecting this valley, and transitioning to a new frequency, the increase in switching frequency due to the reduction in output loading is controlled.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Quasi-resonant power converters suffer from audible noise and inefficiencies while providing for wide input and output ranges. In particular, a converter that is capable of driving a high load, will increasing the pulse width modulation (PWM) frequency under lightly loaded conditions, resulting in inefficient operation. Furthermore, the requirement to satisfy Energy Star and other "green" regulations has motivated the use of the burst mode function, which can also generate audible noise under specific loading conditions.

Figure 1:
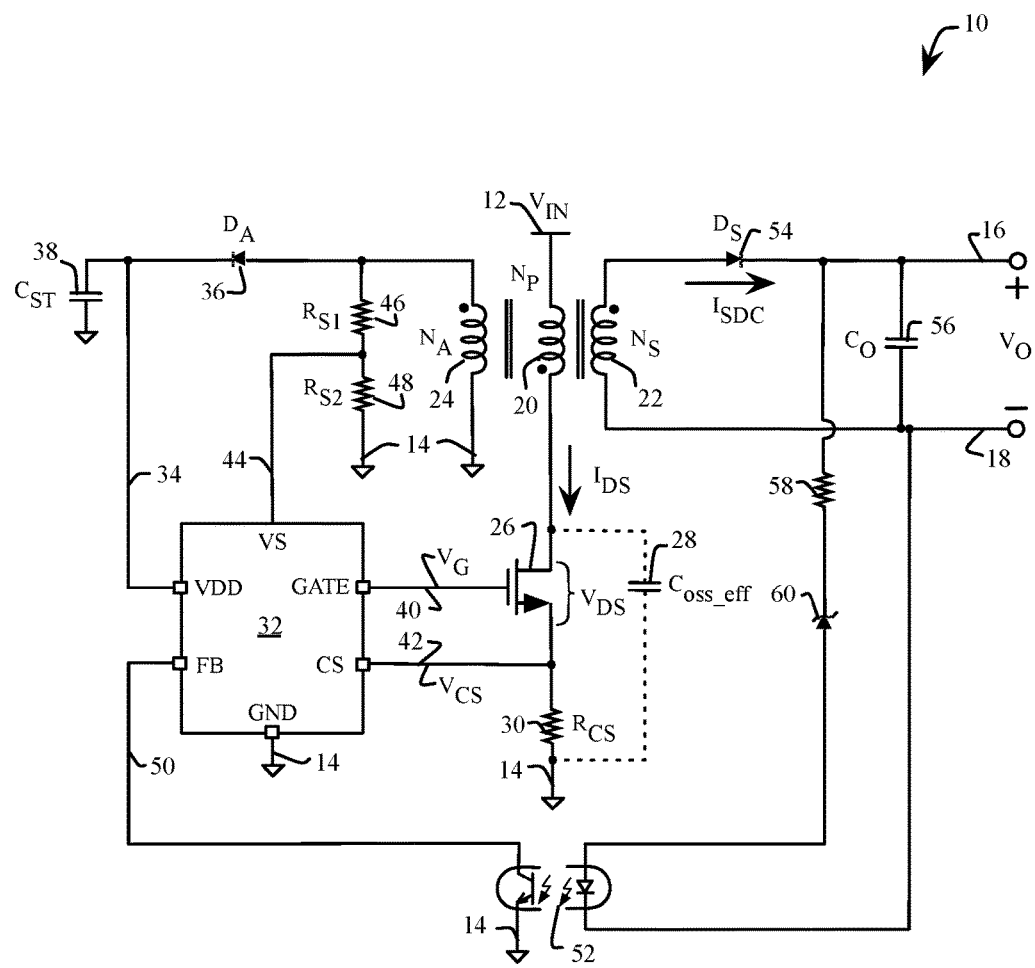
FIG. 1 is a schematic view of an example embodiment of a Quasi-Resonant (QR) converter.

FIG. 1 shows an embodiment of a QR converter 10 including a controller configured to modulate the gate of a primary-side (e.g., low-side) switch, based on current sensed from the primary side (Vcs), a secondary (output) voltage Vs, inferred from an auxiliary winding, and a feedback signal (FB) opto-coupled to the output.

The QR converter 10 receives a voltage at an input terminal 12, referenced to a ground terminal 14 and generates an output voltage (Vo) between a positive terminal 16 and a negative terminal 18. The input terminal 12 connects to a primary winding 20 of a transformer. The primary winding 20 is magnetically coupled to a secondary winding 22 with reverse sense and an auxiliary winding 24 with reverse sense (e.g., as denoted by the "dot" on the windings). The primary winding 20 is further connected in series to the primary-side switch 26. An output capacitance (Coss_eff) 28 is in parallel with the primary-side switch 26 and a series-connected resistor 30.

A controller 32 controls the QR converter 10. The controller 32 is powered by VDD 34, which is derived from an auxiliary current flowing through the auxiliary winding 24, rectified by an auxiliary diode 36 and filtered by a capacitor 38. The controller 32 controls the gate of the primary-side transistor 26 with a GATE signal 40 in response to a current sense voltage 42, generated by the primary current flowing through the resistor 30, and by a voltage sense signal 44, generated at a resistor tap formed by resistors 46 and 48. The current sense voltage 42 is proportional to the instantaneous primary current, and the voltage sense 44 is proportional to the instantaneous secondary current, obtained through the auxiliary winding. In one embodiment, the auxiliary winding 24 has the same number of winding turns as the secondary winding 22. In another embodiment, the number of winding turns of the auxiliary winding 24 and the secondary winding 22 has a ratio other than unity, and the controller 32 compensates for the ratio.

The controller 32 is also responsive to a feedback voltage 50, coupled from the output voltage by an optocoupler 52. Specifically, when the output voltage is high, the optocoupler 52 pulls 50 low, thus $V_{FB}$ 50 is low for high output loading and high for low output loading. The output voltage is rectified by a secondary diode 54, and filtered by a capacitor 56. In one embodiment, the feedback voltage 50 is further conditioned from the output voltage by a resistor 58 and a zener diode 60.

Figure 2:
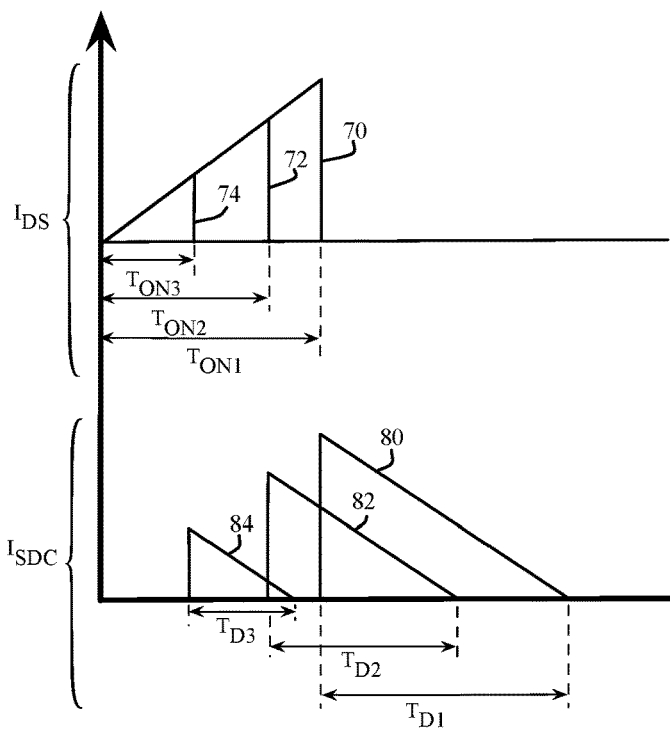
FIG. 2 and FIG. 3 are graphical views of QR conversion cycles with progressive reductions in output loading.
Figure 3:
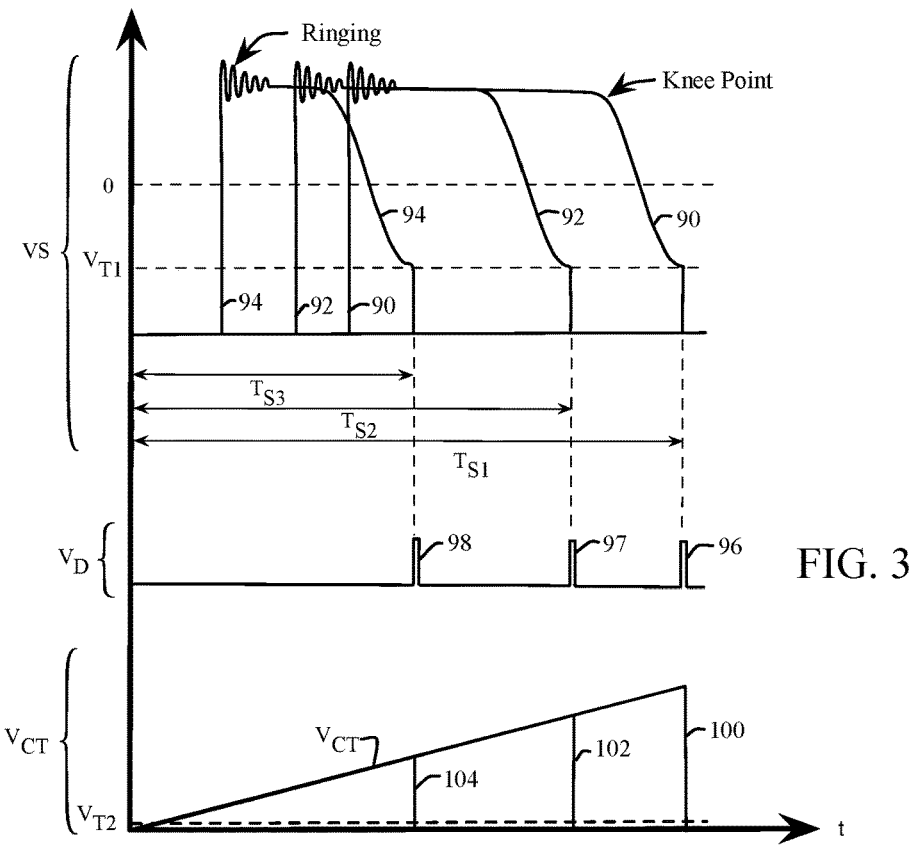

Referring to FIG. 2 and FIG. 3, in quasi-resonant (QR) operation, the controller 32 is able to detect the occurrence of valleys, wherein the resonant voltage formed from a magnetizing inductance of the primary winding 24 of the transformer and an effective capacitance 28 of the low-side switch is at a minimum. When in such valley, the drain voltage level of the primary-side transistor 26 is minimum. The controller uses the current sense voltage 42 to detect the valley point.

Initially, the QR converter 10 has an output loading requiring a primary current 70 with duration Ton1. With a decrease in output loading the primary current reduces to the current 72 and subsequently current 74, with durations Ton2 and Ton3 respectively. The primary currents 70, 72 and 74 generate secondary currents 80, 82 and 84 respectively with progressive reductions in amplitude and duration as shown in FIG. 2. Following the decay of the secondary current to zero, due to the depletion of magnetic flux in the transformer of the QR converter 10, the voltage sense waveform 44 shows the start of resonance at the knee point, and reaching a minimum (e.g., valley point) as show by the valley detect signal 96. Similarly, the voltage sense waveforms 92 and 94 reach a minimum as shown by respective valley detect signals 97 and 98.

When output loading is reduced, the peak of the primary current ($I_{DS}$) and secondary current ($I_{SDC}$) will be reduced as well. The peak current of $I_{DS}$ is controlled by the feedback voltage (FB). When the output loading is decreased, the operation period $T_S$ is also reduced. Accordingly, the operation frequency is increased significantly when the output is lightly loaded. If the operation frequency is very high under light loads, switching losses increase, which is undesirable. To avoid high frequency operation resulting from output load reductions, the maximum operation frequency is limited with the invention described herein. As the output load is reduced, the frequency is maintained or reduced, which requires a further reduction in primary and secondary current peaks to transfer the same amount of energy from the input of the QR converter 10 to the output load.

A blanking time is generated by ramping a charging time voltage ($V_{CT}$) from the start of the QR conversion cycle (e.g., operation) and terminating at the valley detect signal. With reference to FIG. 3, the three cycles with progressive load reductions have correspondingly reduced blanking times defined by the charging time voltages 100, 102 and 104.

Figure 4:
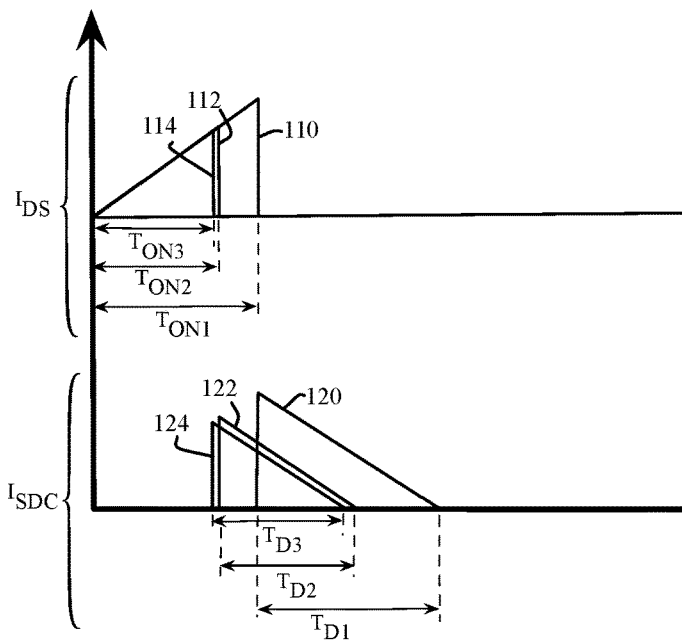
FIG. 4 and FIG. 5 are graphical views of QR conversion cycles with frequency reduction using blanking time extensions.
Figure 5:
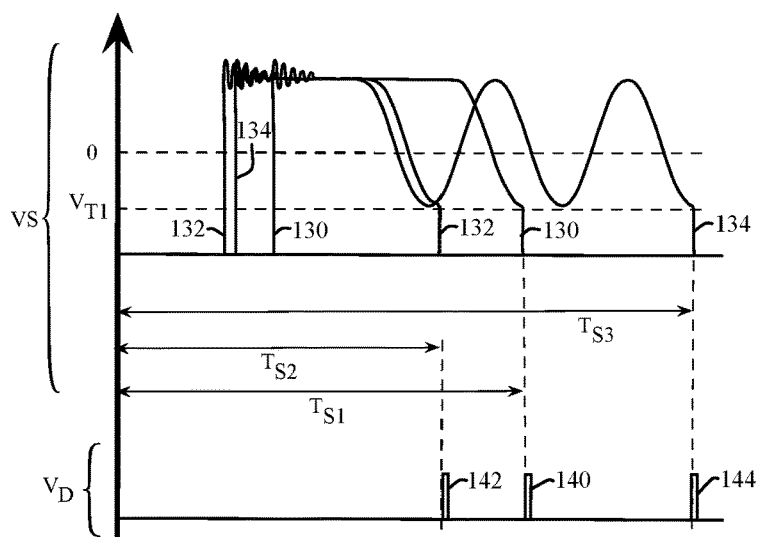
Figure 5:
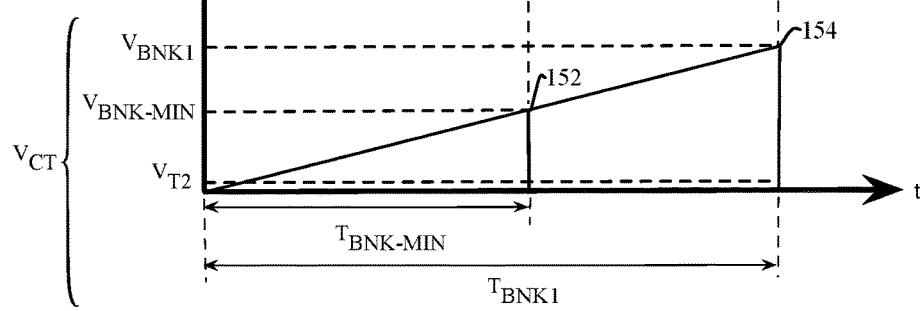

Referring now to FIG. 4 and FIG. 5, the use of blanking times is shown to prevent the operation frequency from increasing to the point where switching losses become substantial. An initial load reduction changes the primary current from 110 to 112, the secondary current from 120 to 122, the voltage sensed waveform from 130 to 132 and the detected valley point from 140 to 142. In contrast to waveforms of FIG. 2 and FIG. 3, a further load reduction, does not substantially reduce the peak of the primary current nor increase the operation frequency. Instead, the primary current 114 is maintained with a similar peak amplitude as 112, and the frequency is reduced to lower the amount of energy delivered to the output load, and to prevent unacceptable switching losses due to an increase in operation frequency.

Specifically, the primary current is changed from 112 to 114, the secondary current is changed from 122 to 124, and the voltage sense waveform is changed from 132 to 134. The voltage sense waveform is changed from 132 to 134 by forming a minimum blanking time at 152 corresponding to the valley point 142, where the resonant voltage is at a minimum, then changing the operation frequency to a reduced frequency without introducing substantial switching discontinuities. The new operation frequency corresponding to the voltage sense waveform 134, thus has a new valley point 144 and corresponding blanking time at 154.

Figure 6:
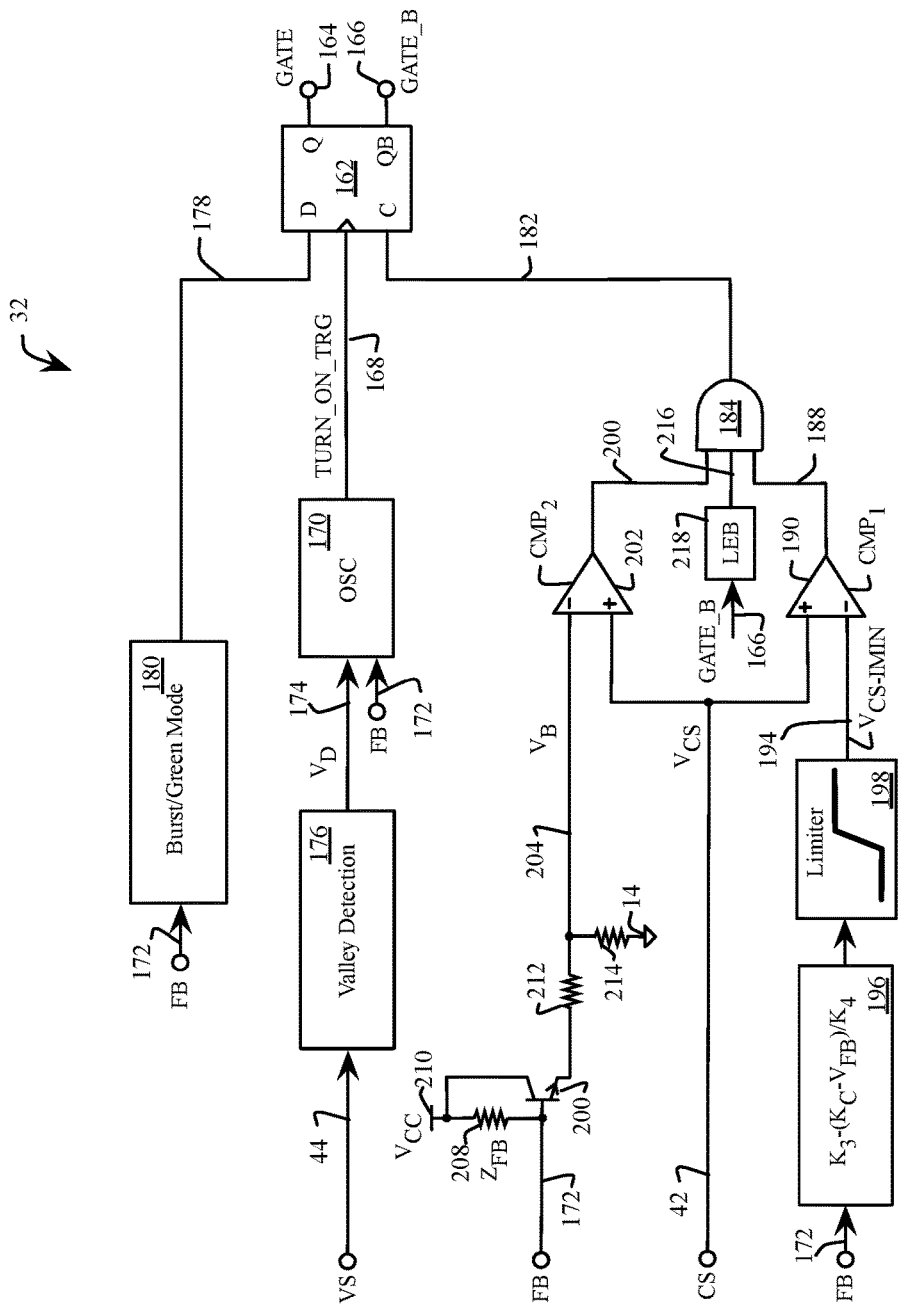
FIG. 6 is a schematic view of a controller for a QR converter in accordance with an embodiment of the present disclosure.

FIG. 6 shows an embodiment of the controller 32 of FIG. 1. It should be appreciated that the various embodiments presented in FIG. 6 and FIG. 7 having logic gates may be implemented with a combination of other logic gates having the same logical equivalency. For example, an AND gate can be substituted for a NAND gate followed by an INVERTER. The controller 32 includes a bistable device (e.g., a D-flop in one embodiment) with a GATE 164 output and a complementary GATE_B 166 output. The bistable device 162 is clocked by a TURN_ON_TRG signal 168 from an oscillator (OSC) 170. The oscillator 170 is controlled by the feedback voltage (FB) 172 and a valley detection signal 174, generated from a Valley Detection circuit 176. The Valley Detection circuit 176 is controlled by the voltage sense signal 44. In various embodiments, a data input 178 is generated by a Burst/Green Mode circuit 180, controlled by the feedback signal 172. The Burst/Green Mode circuit 180 provides a series of logic one data values during a burst mode operation for maintaining the output voltage under very light loads.

The bistable device 162 is cleared by a signal 182 from an AND gate 184. The AND gate 184 has CMP1 input 188 from a first comparator (CMP1) 190. The first comparator 190 compares the current sense voltage 42 to a minimum current sense voltage ($V_{CS-IMIN}$) 194. The minimum current sense voltage 194 is derived from the feedback voltage 172, modified by a $V_{CS}$ transfer function 196. In various embodiments, the $V_{CS}$ transfer function is defined as follows:

$$K_3 - (K_C - V_{FB})/K_4 \quad (1)$$

The variables $K_C$, $K_3$ and $K_4$ are defined as follows:

$$K_C = V_{FB2} \quad (2)$$

$$K_3 = K_{CONSTANT} \quad (3)$$

$$K_4 = (V_{FB2} - V_{FB1})/(V_{CS-IMIN-H} - V_{CS-IMIN-L}) \quad (4)$$

The $V_{CS}$ transfer function 196 is controlled by the feedback voltage 172 and is further limited by a $V_{CS}$ limiter 198 to produce the minimum current sense voltage 194. The AND gate 184 has a CMP2 input 200 from a second comparator (CMP2) 202. The second comparator 202 compares the current sense voltage 42 to a bias voltage ($V_B$) 204. The bias voltage 204 is derived from the feedback voltage 172, modified by a diode-connected gain circuit. The diode connection is formed with a Bipolar Junction Transistor (BJT) 206 with a base connected to the feedback signal 172 and biased to a supply voltage (VCC) 210 by a resistor 208. The collector of the BJT 206 is connected to VCC 210. The emitter of the BJT 206 is connected to the gain circuit formed by resistors 212 and 214 to provide the bias voltage 204. In other embodiments, a diode replaces the connection between the feedback voltage 172 and the gain circuit.

The AND gate 184 also has an input 216 from a Leading Edge Blanking (LEB) circuit 218. The LEB circuit 218 is controlled by the complementary gate 166. The embodiment of the controller 32 activates the gate 164 that turns on the primary-side transistor 26, at the start of the blanking time defined by the TURN_ON_TRG 168 signal, and deactivates the gate 164 in response to the current sense voltage 42 exceeding both the minimum current sense voltage 194 and the bias voltage 204, and further in response to the LEB 218 being activate (e.g., logic one).

Figure 7:
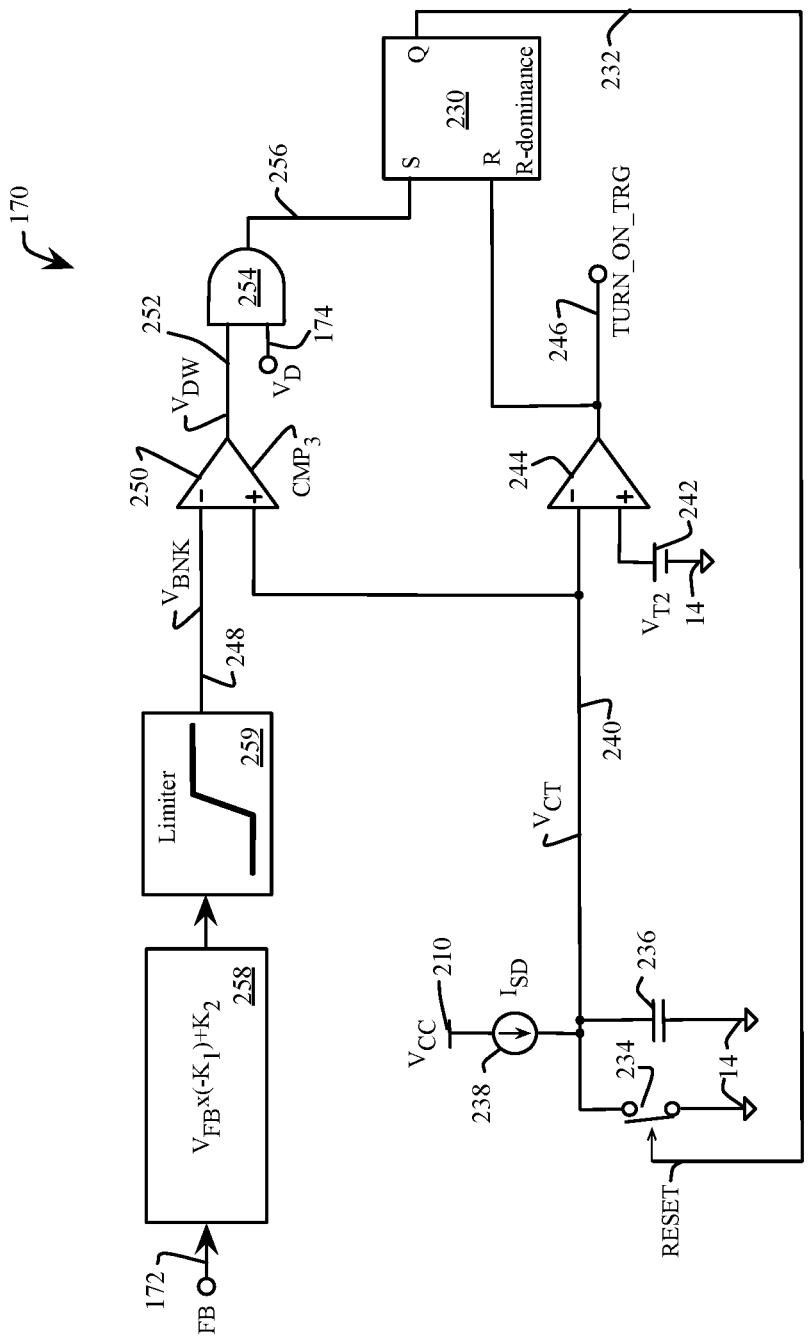
FIG. 7 is a schematic view of the oscillator shown in FIG. 4 in accordance with an embodiment of the present disclosure.

Referring now to FIG. 7, the oscillator 170 of FIG. 6 is described. The oscillator 170 includes a bistable device 230. In various embodiments, the bistable device 230 is an S-R flip flop with R-dominance (e.g., a signal asserted on the R, or Reset, input takes precedence over an asserted signal on the S, or Set, input). The bistable device 230 outputs a RESET signal 232 to reset a switch 234, when RESET 232 transitions to a high state. The switch 234 is reset when closed, thus shunting a capacitor 236 to ground 14. When the capacitor 236 is shunted to ground, a voltage $V_{CT}$ 240 is less than a second threshold voltage $V_{T2}$ 242, which causes a comparator 244 to output a high level on a TURN_ON_TRIG 246 signal. The high level on TURN_ON_TRIG 246 resets the bistable device 230, causing the switch 234 to open.

The capacitor 236 is subsequently charged with a current source 238 connected to VCC 210 after the RESET 232 transitions to a low state, thus forming a voltage ramp. When $V_{CT}$ 240 exceeds the second threshold voltage 242, TURN_ON_TRIG signal 246 transitions low to remove the reset on the bistable device 230. As $V_{CT}$ 240 continues to ramp up, $V_{CT}$ 240 exceeds a blanking voltage ($V_{BNK}$) 248 causing a third comparator 250 to output a high level on $V_{DW}$ 252. When both $V_{DW}$ 252 and the valley detect signal 174 are high, the AND gate 254 outputs a high level on signal 256 to set the bistable device 230, thereby resetting the switch 234. The blanking voltage 248 is derived from the feedback voltage 172, modified by a $V_{BNK}$ transfer function 258. In various embodiments, the $V_{BNK}$ transfer function is defined as follows:

$$V_{FB} \times (-K_1) + K_2 \qquad (5)$$

The variables $K_1$ and $K_2$ are defined as follows:

$$K_1 = (V_{BNK-MAX} - (V_{BNK-MIN} \times (V_{FB4}/V_{FB3})))/((V_{FB3} - V_{FB4})/V_{FB3}) \qquad (6)$$

$$K_2 = (V_{BNK-MIN} - K_1)/V_{FB3} \qquad (7)$$

Figure 8:
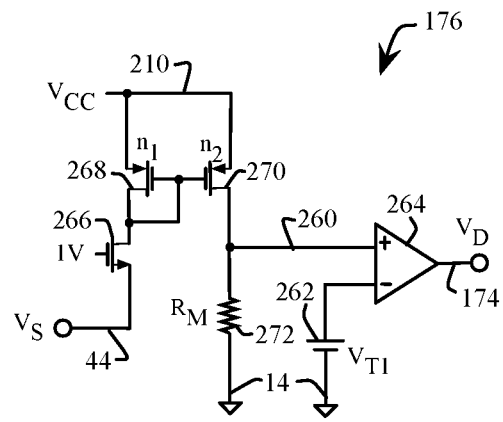
FIG. 8 is a schematic view of the valley detection circuit shown in FIG. 4 in accordance with an embodiment of the present disclosure.

The $V_{BNK}$ transfer function 258 is controlled by the feedback voltage 172 and is further limited by a $V_{BNK}$ limiter 259 to produce the minimum blanking voltage 248. Accordingly, the embodiment of the oscillator 170 produces a TURN_ON_TRIG signal 246 with a period equal to a blanking time, as defined by the blanking voltage 248, and phase aligned with valley of the resonant waveform of the QR converter 10 as defined by the valley detect signal 174. The TURN_ON_TRIG signal 246 is generated with a pulse width equal to an asynchronous loop delay including the delay of the bistable device 230, the switch 234 and the comparator 244. FIG. 8 shows the valley detection circuit 176 of FIG. 6. The valley detection circuit 176 compares a mirrored voltage 260 to a first threshold voltage 262 using a comparator 264. The comparator 264 generate the valley detect signal 174. The mirrored voltage 260 is derived from the voltage sense 44 with current mirror. In one embodiment, the current mirror is formed with an NFET 266 coupling the voltage sense 44 to a pair of NFETs 268 and 270 as depicted in FIG. 8, however other current mirrors are anticipated to be within the scope and spirit of this circuit implementation. With reference to FIG. 1 and FIG. 8, when the secondary current 54 through the secondary winding 22, and thus the auxiliary current through the auxiliary winding 24 is minimal, the voltage sense signal 44 is pulled to ground by resistor 48. When the voltage sense signal 44 is pulled to ground, additional current flows through the NFET 268 and thus through the NFET 270 due to mirroring. The additional current through NFET 270 increases the voltage across resistor 272, which causes the comparator 264 to transition high when the mirrored voltage 260 exceeds the first threshold voltage 262. The valley point as defined by the leading edge of the valley detect signal 174 is not an absolute minimum of the secondary current 54 due to the offset imposed by the first threshold voltage 262. However, the valley detect signal 174 is substantially equal to the absolute minimum of the secondary current 54 while a providing reliable sensing margin.

Figure 9:
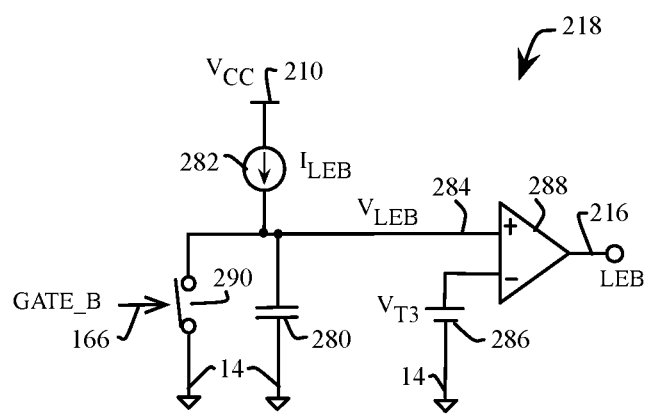
FIG. 9 is a schematic view of the leading edge blanking (LEB) circuit shown in FIG. 4 in accordance with an embodiment of the present disclosure.

FIG. 9 shows an embodiment of the LEB circuit 218 of FIG. 6. The LEB circuit 218 generates the LEB signal 216 with a delayed activation to avoid the leading edge ringing associated with the voltage sense signal 42 of FIG. 3. The LEB circuit 218 includes a capacitor 280 that is charged by a current source 282 connected to $V_{CC}$ 210. A voltage $V_{LEB}$ 284 is developed across the capacitor 280 and is compared with a third voltage threshold 286 by a comparator 288 to provide the LEB signal 216. The third threshold voltage 286 is chosen to delay the activation of the LEB signal 216 until after the ringing of the voltage sense waveform 42 of FIG. 3. Upon activation of GATE_B 166 (e.g., deactivation of the GATE 164), a switch 290 shunts the capacitor 280, thus deactivating the LEB signal 216.

Figure 10:
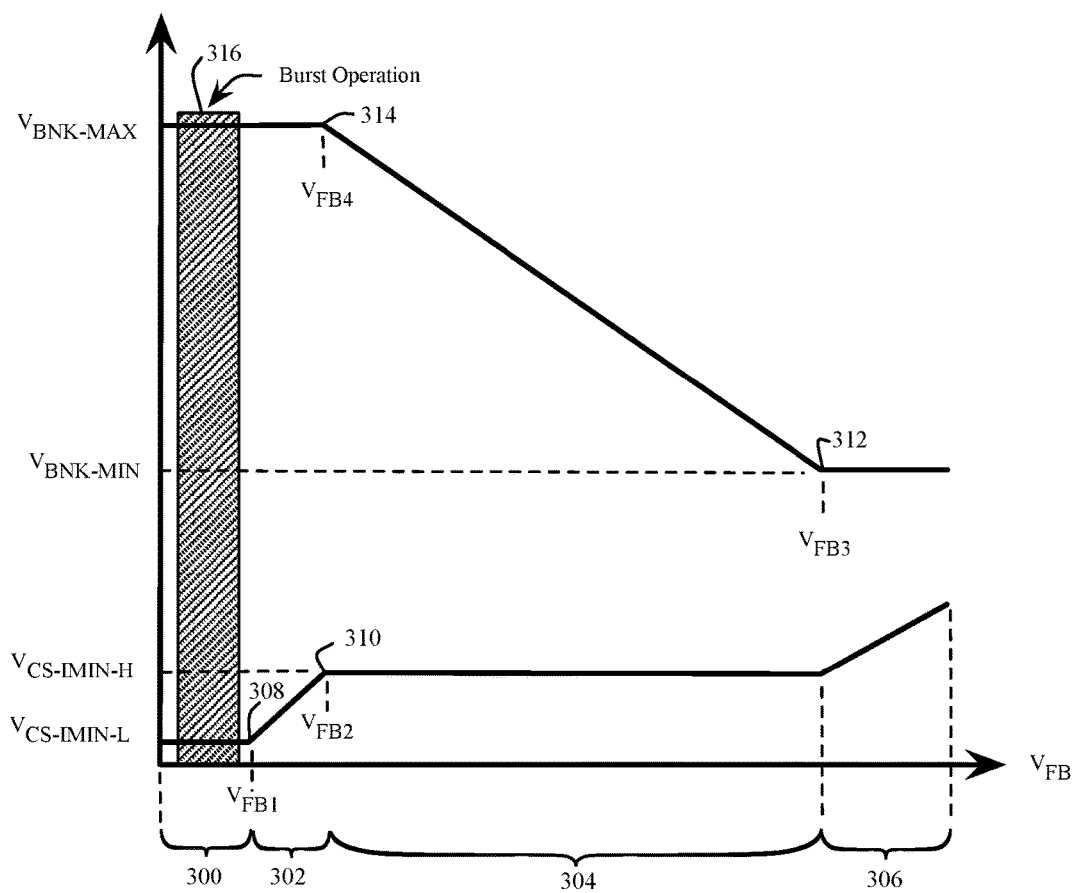
FIG. 10 is a graphical view of QR conversion cycles with an adjustment of the primary peak current levels.

FIG. 10 shows the adjustment to primary peak current levels and blanking time in response to changes to the output loading of a QR converter. The feedback voltage $V_{FB}$ 50 measures the output loading. The current sense voltage $V_{CS}$ 42 measures the primary peak current. The blanking voltage $V_{BNK}$ 248 measures the blanking time.

Accommodating wide input and output conditions of a QR converter beneficially provides higher average conversion efficiency and power density. In a QR operation, the operation frequency should be reduced properly to achieve these benefits. In Discontinuous Conduction Mode (DCM) operation, the power delivery is based on peak current of $I_{DS}$ and operation frequency ($1/T_S$). The output power of the QR converter is expressed by the following equation:

$$P_O = \tfrac{1}{2}[(L_M)(I^2_{PK})(1/T_S)] \qquad (8)$$

To achieve the frequency reduction during QR operation, the blanking time is extended during a valley point to prevent switching discontinuities. The blanking time is also modulated by the feedback signal as a measure of output loading and the current sense voltage as a measure of the primary current. For power stage stability, the peak current of $I_{DS}$ should be kept at a level to minimize the operation frequency during light output load. Conversely, when the QR converter enters burst mode operation, the higher peak current of $I_{DS}$ and lower frequency might cause louder audio noise. Accordingly, before the QR converter enters the burst mode operation, the peak current of $I_{DS}$ is reduced to minimize audio noise, while maintaining higher peak current (and lower frequency) at high output loads.

Referring to FIG. 10, four operating phases are shown for adjusting the blanking time and primary current as a function of output load. Phase 300 corresponds to very light output loading, phase 302 to light output loading, phase 304 to medium loading and phase 306 to heavy loading. In one embodiment, phase 300 includes loads of 0% to 5% of the maximum output loading, phase 302 includes loads of 5% to 25%, phase 304 includes loads of 25% to 50%, and phase 306 includes loads of 50% to 100%. The $V_{CS}$ transfer function 196 of FIG. 6 includes variables that are defined by $V_{FB1}$ 308 and $V_{FB2}$ 310 to implement the four phases of primary current adjustment, (using $V_{CS}$), as a function of output load, (using $V_{FB}$). The $V_{BNK}$ transfer function 256 of FIG. 7 includes variables that are defined by $V_{FB3}$ 312 and $V_{FB4}$ 314 to implement three of the four phases of blanking time adjustment, (using $V_{BNK}$), as a function of output load, (using $V_{FB}$).

When the QR converter is heavily loaded during phase 306, the minimum blanking time $V_{BNK-MIN}$ is maintained while the primary current is reduced from an initial level to a first current level. When the QR converter load is reduced to enter phase 304, to prevent the operation frequency from unduly increasing and thereby increasing switching losses, the operation frequency is reduced by increasing the blanking time by multiples of the resonant period (e.g., aligned with the detected valley point). During phase 304, the primary current is maintained at a first current level. When the QR converter load is reduced to enter phase 302, the blanking time is maintained at a maximum $V_{BNK-MAX}$, while the primary current is further reduced to a second current level. During phase 300, the burst mode operation 316 is enabled using the Burst/Green Mode circuit 180 of FIG. 6. During phase 304, maintaining a first current level allows the frequency to be reduced to reduce switching losses. During phase 300, the second current level is sufficiently lower than the first current level to substantially limit, or prevent, generated audible noise that could be detected by the human ear (e.g., 2 KHz-3 KHz). In one embodiment, the audible noise is limited to ultrasonic frequencies.

Figure 11:
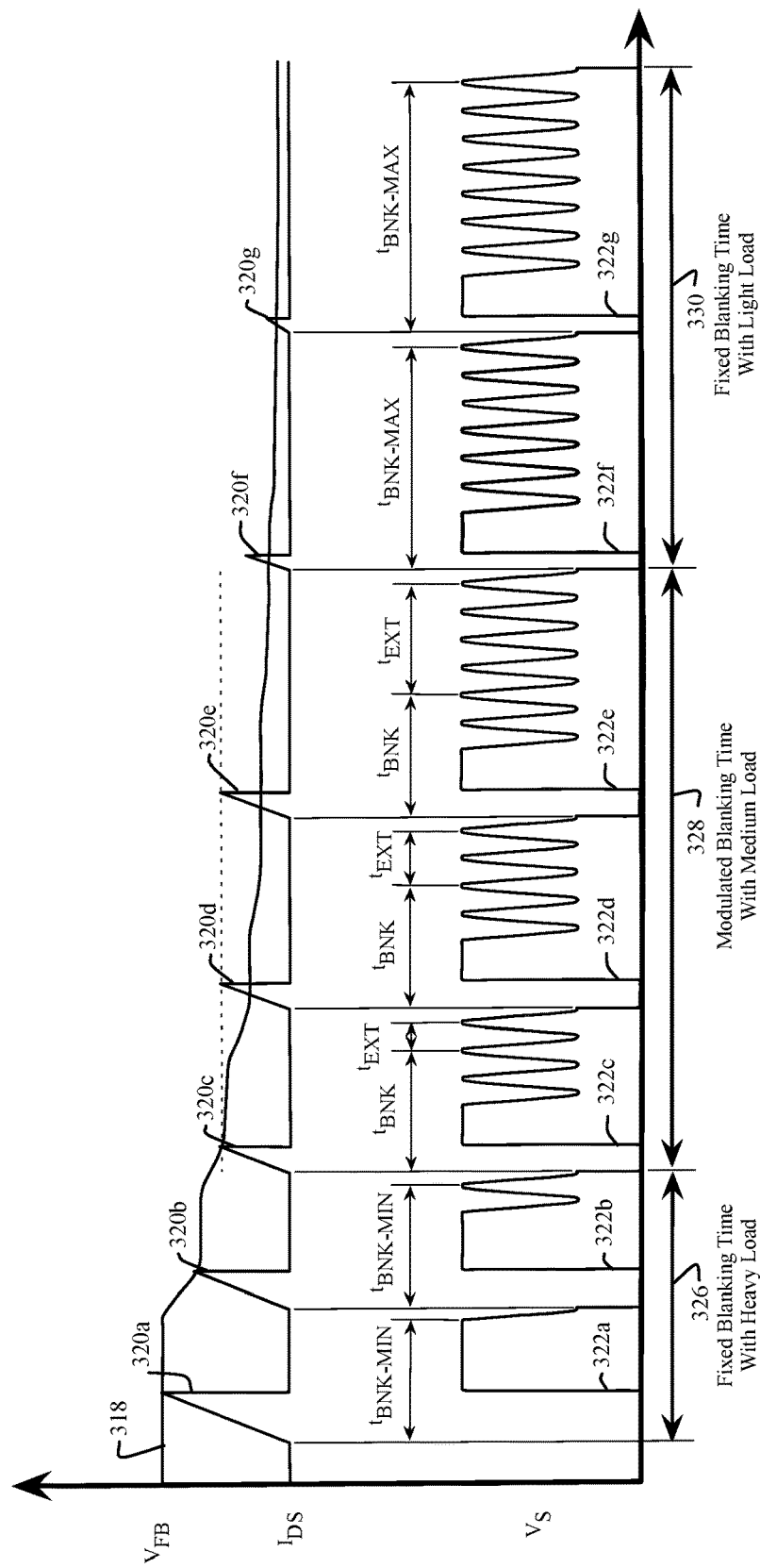
FIG. 11 is a graphical view of QR conversion cycles with adjustments to the blanking time and primary peak current levels.

FIG. 11, with reference to FIG. 1 and FIG. 10 further illustrate the adjustments to the blanking time and primary peak current levels. In FIG. 11, the feedback voltage $V_{FB}$ 318 is inversely proportional to the output loading. During a fixed blanking time 326, as $V_{FB}$ 318 is reduced from a heavy output loading to a medium output loading, the primary current progressively reduces from 320a to 320b to 320c, and the blanking time is maintained at a minimum value $t_{BNK-MIN}$ while the voltage sense shows an increase in resonant frequency at 322a and 322b. Here, the blanking time is aligned to integer multiples of the valley detect point as the resonant frequency increases, thus maintaining a fixed operation frequency.

During a modulated blanking time 328, as $V_{FB}$ 318 is reduced from a medium output loading to a light output loading, the primary current 320c, 320d and 320e is maintained at the first current level, and the blanking time is extended from the minimum value $t_{BNK-MIN}$ to a maximum value $t_{BNK-MAX}$, while the voltage sense shows a constant resonant frequency.

During a fixed blanking time 330, as 1 $V_{FB}$ 318 is reduced from a light output loading, the primary current 320f and 320g is reduced from the first current level to a second current level, and the blanking time is maintained at the maximum value $t_{BNK-MAX}$, while the voltage sense shows a constant resonant frequency.

Figure 12:
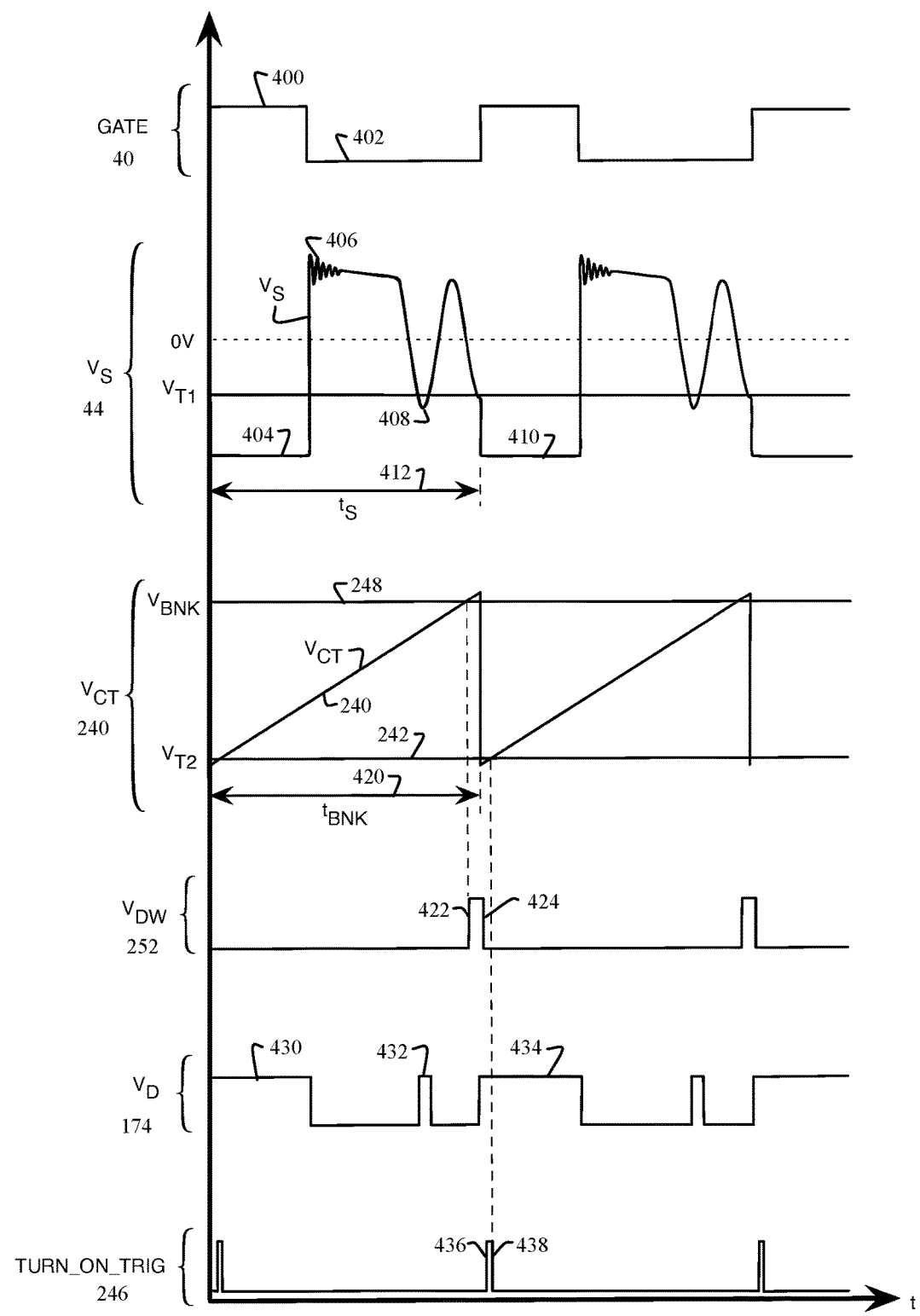
FIG. 12 and FIG. 13 are graphical views of various timing signals for QR conversion cycles.
Figure 13:
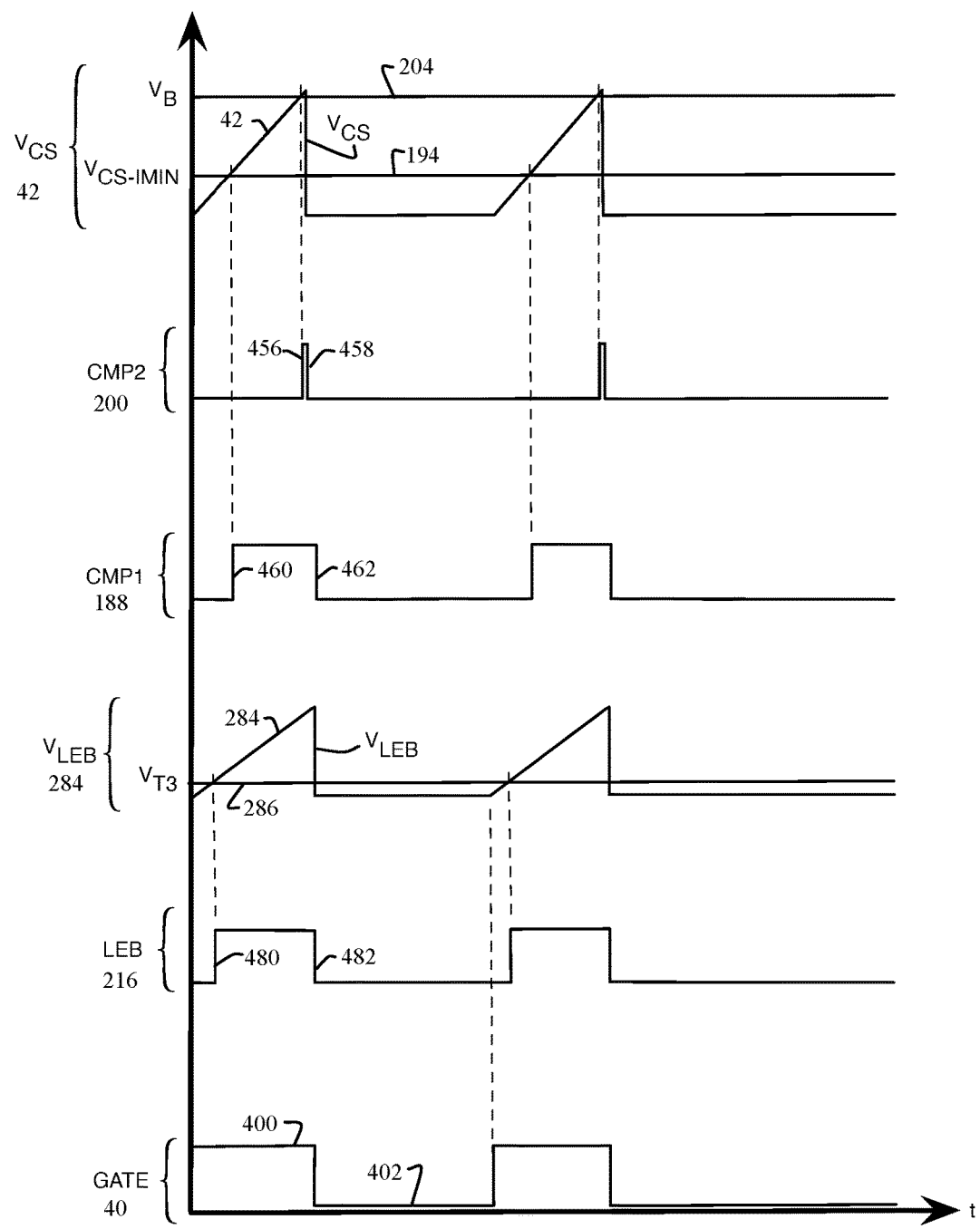

FIG. 12 and FIG. 13 further illustrate the operation and signal timing of the circuits in FIG. 1 and FIG. 6 to FIG. 9. Referring to FIG. 12, the gate 40 has an active phase 400 and an inactive phase 402. During the active phase 400, the primary-side transistor 26 is activated to allow primary current to flow through the primary winding 24. During the active phase 400, the voltage sense shows no secondary current at 404 as magnetic flux builds in the transformer of the QR converter. As the gate 40 transitions to the inactive phase 402, the secondary current 54 measured by the voltage sense 44 rises in response to the flux in the transformer, with an initial ringing 406 on the leading edge. After the transformer has demagnetized by depleting the flux in a core of the transformer, the resonant cycle begins, with a first valley point at 408. In the example embodiment of FIG. 12, the resonant cycle ends at 410 with the second valley point blocked by a blanking timer, thus the QR operation period is $t_S$ 412.

Referring to FIG. 7 and FIG. 12, when the $V_{CT}$ waveform 240 exceeds the second threshold voltage 242, the TURN_ON_TRIG 246 transitions low at 438. As the $V_{CT}$ waveform 240 continues to ramp up and exceeds $V_{BNK}$ 248 then $V_{DW}$ 252 transitions high at 422. The valley detect signal 174 is high at 430, 432 and 434 when $V_S$ 44 is low at 404, 408 and 410. When both $V_{DW}$ 252 and $V_D$ 174 are high, the bistable device 230 is set, which resets the $V_{CT}$ 240 voltage to ground thereby deactivating VDW 252 at 424 and activating TURN_ON_TRIG 246 at 436.

Referring to FIG. 6, FIG. 9 and FIG. 13, when the current sense voltage 42 exceeds $V_{CS\_IMIN}$ 194, the second comparator $CMP_2$ 200 transitions high at 460. When the current sense voltage 42 exceeds $V_B$ 204, the first comparator $CMP_1$ 188 transitions high at 456. In FIG. 9, when $V_{LEB}$ 284 exceeds the third threshold voltage 286, LEB 216 transitions high at 480. With $CMP_1$ 188, $CMP_2$ 200 and LEB 216 all high, the AND gate 184 clears the bistable device 162, causing the GATE 40 to transition to the low state 402, and GATE_B 166 to transition high. GATE_B 166 thus resets $V_{LEB}$ 284 low and thus LEB low at 482. With the GATE 40 deactivated, the primary-side transistor 26 turns off, causing $V_{CS}$ 42 to be pulled to ground, and thus deactivating $CMP_1$ at 462 and $CMP_2$ 458.

Figure 14:
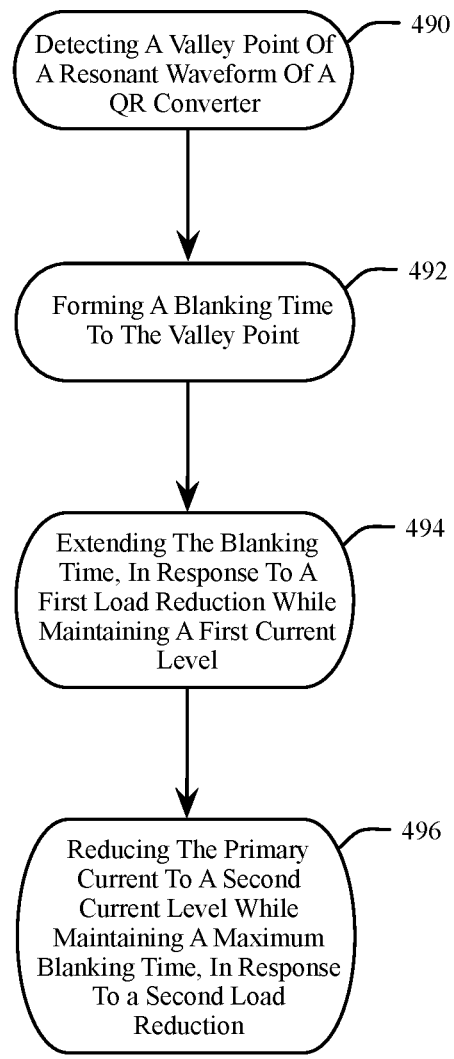
FIG. 14 is a flowchart representation of method for frequency reduction of a QR converter.

FIG. 14 shows a method for frequency reduction in accordance with an example embodiment. At 490, a valley point of a resonant waveform of a QR converter 10 is detected, for example, with a valley detection circuit 176. At 492, a blanking time 420 is formed from the beginning of a QR conversion cycle and ending at a valley point. At 494, the blanking time is extended, in response to a first load reduction, while maintaining the primary current at a first current level, for example at phase 304 of FIG. 10. At 496, the primary current is reduced to a second current level while maintain a maximum blanking time, in response to a second load reduction, for example at phase 302 of FIG. 10.

Figure 15:
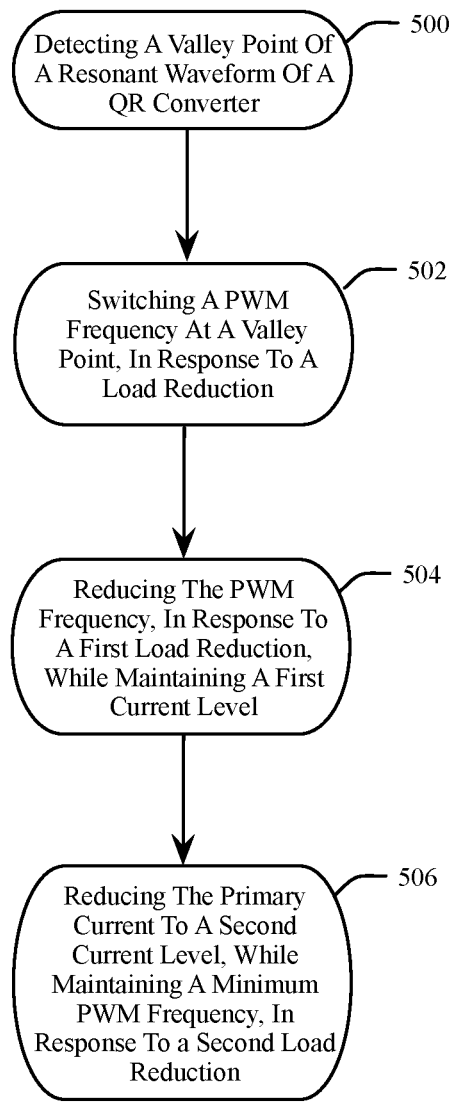
FIG. 15 is a flowchart representation of method for frequency reduction of a QR converter.

FIG. 15 shows another method for frequency reduction in accordance with an example embodiment. At 500, a valley point of a resonant waveform of a QR converter 10 is detected. At 502, a PWM frequency is switched at a valley point, in response to a load reduction. At 504, the PWM frequency is reduced in response to a first load reduction, while maintaining a first current level, (for example at phase 304 of FIG. 10). At 506, the primary current is reduced to a second current level, while maintaining a minimum PWM frequency, in response to a second load reduction, (for example at phase 302 of FIG. 10).

As will be appreciated, embodiments as disclosed include at least the following. In one embodiment, a method for frequency reduction of a quasi-resonant (QR) converter comprises detecting a valley point of a resonant waveform of the QR converter, by detecting a voltage level of the resonant waveform falling below a first threshold voltage. A blanking time is formed from the beginning of a QR conversion cycle to the valley point. The blanking time is extended, in response to a first reduction of an output loading of the QR converter, while maintaining a primary current of the QR converter at a first current level. The primary current is reduced to a second current level being less than the first current level, while maintaining the blanking time at a maximum blanking time, in response to a second reduction of the output loading.

Alternative embodiments of the method for frequency reduction of a QR converter include one or the following features, or any combination thereof. A burst mode operation is performed with the primary current at the second current level in response to a reduction of an output voltage of the QR converter. The primary current is reduced from an initial level to the first current level, while maintain the blanking time at a minimum blanking time, in response to an initial reduction of the output loading. A frequency of the QR converter is changed at the end of the blanking time. The first reduction is at 50 percent of a full current load at the output of the QR converter, and the second reduction is at 25 percent of the full current load. Audible noise from the burst mode operation is generated at the second current level and not at the first current level. Detecting the valley point includes sensing an auxiliary current in an auxiliary winding of the QR converter, generating a mirrored voltage derived from the auxiliary current with a current mirror, and comparing the mirrored voltage to the first threshold voltage. Forming the blanking time comprises changing a state of a bistable device in response to detecting the valley point and a voltage ramp exceeding a blanking voltage, the blanking voltage derived from a feedback voltage. The primary current is controlled with a series-connected primary-side transistor controlled by a gate signal, the gate signal formed by clocking a bistable device with an oscillator and by clearing the bistable device in response to a current sense voltage exceeding a minimum current sense voltage and exceeding a feedback voltage, the current sense voltage proportional to the primary current and the feedback voltage proportional to an output voltage of the QR converter. The bistable device is cleared in response to a current sense voltage exceeding a minimum current sense voltage and a feedback voltage, and activating a leading edge blanking (LEB) signal. A logic value of the gate signal is determined during the burst mode operation by changing a data value of the bistable device in response to a value of the feedback voltage, In another embodiment, a controller for a QR converter comprises a bistable device. A valley detection circuit is configured to detect a valley point during a QR conversion cycle, wherein the valley point is a minimum voltage of a resonant waveform at the primary side of the QR converter. An oscillator is connected to a clock input of the bistable device and configured to oscillate with a period equal to a blanking time, the blanking time beginning at the start of the QR conversion cycle and ending at the valley point. A clearing circuit is connected to a clearing input of the bistable device and is configured to clear the bistable device, the clearing circuit including a first circuit configured to compare a current sense voltage with a minimum current sense voltage, the current sense voltage proportional to the primary current, a second circuit configured to compare the current sense voltage to a feedback voltage proportional to an output voltage of the QR converter, and a leading edge blanking (LEB) circuit.

Alternative embodiments of the controller for a QR converter include one or the following features, or any combination thereof. The bistable device is connected to a gate of a primary-side transistor, the primary-side transistor is configured to conduct a primary current of the QR converter. The valley detection circuit includes a current mirror connected between a resistor tap and a comparator, the resistor tap generating a sensed voltage proportional to a secondary current of the QR converter, the comparator comparing a mirrored voltage to a first threshold voltage to determine the valley point of a QR conversion cycle, wherein the mirrored voltage is mirrored from the sensed voltage. The oscillator includes a bistable device configured to reset a capacitive charging circuit in response to the bistable device being set, the capacitive charging circuit generating a voltage ramp, the voltage ramp compared with a comparator to a blanking voltage proportional to the blanking time, an output of the third comparator setting the bistable device when the valley point is detected. The first circuit includes the current sense voltage connected to a positive input of a first comparator, the minimum current sense voltage connected to a negative input of the first comparator, and the minimum current sense voltage derived from the feedback voltage with a transfer function and a limiter. The second circuit includes the current sense voltage connected to a positive input of a second comparator, a bias voltage connected to a negative input of the second comparator, and the bias voltage derived from the feedback voltage with a gain circuit.

In another embodiment, a method for frequency reduction of a QR converter comprises detecting a valley point of a resonant waveform of the QR converter, by detecting a voltage level of the resonant waveform below a first threshold voltage. A pulse width modulation (PWM) frequency of the QR converter is switched when the resonant waveform is at the valley point, in response to a reduction of an output loading. The PWM frequency is reduced in response to a first reduction of an output loading of the QR converter, while maintaining a primary current of the QR power converter at a first current level. The primary current is reduced to a second current level being less than the first current level, while maintaining the PWM frequency at a minimum frequency, in response to a second reduction of the output loading.

Alternative embodiments of the method for frequency reduction of a QR converter include one or the following features, or any combination thereof. A burst mode operation is performed with the primary current at the second current level in response to a reduction of an output voltage of the QR power converter. The primary current is reduced from an initial level to the first current level, while maintaining the PWM frequency at a maximum frequency, in response to an initial reduction of the output loading.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for frequency reduction of a quasi-resonant (QR) converter comprising:
    detecting a valley point of a resonant waveform of the QR converter, by detecting a voltage level of the resonant waveform falling below a first threshold voltage;

forming a blanking time from a beginning of a QR conversion cycle to the valley point, the blanking time delaying a gate signal for a one or more resonant cycles of the resonant waveform, the gate signal configured to control a conduction of a primary current;

extending the blanking time, in response to a first reduction of an output loading of the QR converter, while maintaining the primary current of the QR converter at a first current level; and reducing the primary current to a second current level being less than the first current level, while maintaining the blanking time at a maximum blanking time, in response to a second reduction of the output loading, wherein the second current level enables a burst mode operation.

2. The method of claim 1 further comprising performing a burst mode operation with the primary current at the second current level in response to a reduction of an output voltage of the QR converter.

3. The method of claim 1 further comprising reducing the primary current from an initial level to the first current level, while maintain the blanking time at a minimum blanking time, in response to an initial reduction of the output loading.

4. The method of claim 1 further comprising changing a frequency of the QR converter at an end of the blanking time.

5. The method of claim 1 wherein the first reduction reduces the output loading to 50 percent of a full current load at the output of the QR converter, and the second reduction reduces the output loading to 25 percent of the full current load.

6. The method of claim 1 wherein audible noise from a burst mode operation is minimized at the second current level and not at the first current level.

7. The method of claim 1 wherein detecting the valley point includes sensing an auxiliary current in an auxiliary winding of the QR converter, generating a mirrored voltage derived from the auxiliary current with a current mirror, and comparing the mirrored voltage to the first threshold voltage.

8. The method of claim 1 wherein forming the blanking time comprises changing a state of a bistable device in response to detecting the valley point and a voltage ramp exceeding a blanking voltage, the blanking voltage derived from a feedback voltage.

9. The method of claim 1 further comprising controlling the primary current with a series-connected primary-side transistor controlled by the gate signal, the gate signal formed by clocking a bistable device with an oscillator and by clearing the bistable device in response to a current sense voltage exceeding a minimum current sense voltage and exceeding a feedback voltage, the current sense voltage proportional to the primary current and the feedback voltage proportional to an output voltage of the QR converter.

10. The method of claim 9 wherein clearing the bistable device is in response to the current sense voltage exceeding the minimum current sense voltage and the feedback voltage, and activating a leading edge blanking (LEB) signal.

11. The method of claim 9 further comprising determining a logic value of the gate signal during a burst mode operation by changing a data value of the bistable device in response to the feedback voltage.

12. A controller for a quasi-resonant (QR) converter comprising:
a bistable device;
a valley detection circuit configured to detect a valley point during a QR conversion cycle, wherein the valley point is a minimum voltage of a resonant waveform at a primary side of the QR converter;
an oscillator connected to a clock input of the bistable device and configured to oscillate with a period equal to a blanking time, the blanking time beginning at a start of the QR conversion cycle and ending at the valley point, wherein the blanking time delays an output of the bistable device for a one or more resonant cycles of the resonant waveform;
a clearing circuit connected to a clearing input of the bistable device and configured to clear the bistable device, the clearing circuit including,
a first circuit configured to compare a current sense voltage with a minimum current sense voltage, the current sense voltage proportional to a primary current,
a second circuit configured to compare the current sense voltage to a feedback voltage proportional to an output voltage of the QR converter, and
a leading edge blanking (LEB) circuit; and
a burst mode circuit connected to a data input of the bistable device, wherein the burst mode circuit is enabled in response to the feedback voltage being equal to or less than a first feedback voltage, wherein the first feedback voltage corresponds to a primary current of the QR converter being equal to a second current level.

13. The controller of claim 12 wherein the output of the bistable device is connected to a gate of a primary-side transistor, the primary-side transistor configured to conduct the primary current of the QR converter.

14. The controller of claim 12 wherein the valley detection circuit includes a current mirror connected between a resistor tap and a comparator, the resistor tap generating a sensed voltage proportional to a secondary current of the QR converter, the comparator comparing a mirrored voltage to a first threshold voltage to determine the valley point of the QR conversion cycle, wherein the mirrored voltage is mirrored from the sensed voltage.

15. The controller of claim 12 wherein the oscillator includes a second bistable device configured to reset a capacitive charging circuit in response to the second bistable device being set, the capacitive charging circuit generating a voltage ramp, the voltage ramp compared with a comparator to a blanking voltage proportional to the blanking time, an output of the comparator setting the second bistable device when the valley point is detected.

16. The controller of claim 12 wherein the first circuit includes the current sense voltage connected to a positive input of a comparator, the minimum current sense voltage connected to a negative input of the comparator, and the minimum current sense voltage derived from the feedback voltage with a transfer function and a limiter.

17. The controller of claim 12 wherein the second circuit includes the current sense voltage connected to a positive input of a comparator, a bias voltage connected to a negative input of the comparator, and the bias voltage derived from the feedback voltage with a gain circuit.

18. A method for frequency reduction of a quasi-resonant (QR) converter comprising:
detecting a valley point of a resonant waveform of the QR converter, by detecting a voltage level of the resonant waveform below a first threshold voltage;
reducing a Pulse Width Modulation (PWM) frequency in response to a first reduction of an output loading of the QR converter, while maintaining a primary current of the QR converter at a first current level, the PWM frequency reduced by delaying a gate signal by a blanking time equal to a one or more resonant cycles of the resonant waveform, the gate signal configured to control a conduction of the primary current; and reducing the primary current to a second current level being less than the first current level, while maintaining the PWM frequency at a minimum frequency, in response to a second reduction of the output loading, wherein the second current level enables a burst mode operation.

19. The method of claim 18 further comprising performing a burst mode operation with the primary current at the second current level in response to a reduction of an output voltage of the QR converter.

20. The method of claim 18 further comprising reducing the primary current from an initial level to the first current level, while maintaining the PWM frequency at a maximum frequency, in response to an initial reduction of the output loading.

* * * * *